United States Patent [19]

Eckels

[11] 4,034,672

[45] July 12, 1977

[54] LINEAR EXPLOSIVE

[76] Inventor: Robert E. Eckels, 2101 Youngfield St., Golden, Colo. 80401

[21] Appl. No.: 646,343

[22] Filed: Jan. 2, 1976

[51] Int. Cl.² .......................... F42D 3/00; F42B 3/00
[52] U.S. Cl. .............................. 102/23; 102/24 R; 181/116
[58] Field of Search .............................. 102/22–24, 102/27, DIG. 9; 181/116; 86/1 R, 20 C; 222/101, 102

[56] References Cited

U.S. PATENT DOCUMENTS

| | | | |
|---|---|---|---|
| 2,605,704 | 8/1952 | Dumas | 102/24 HC |
| 2,892,377 | 6/1959 | Davidson | 86/1 |
| 3,212,437 | 10/1965 | Saling | 181/116 X |
| 3,265,249 | 8/1966 | Jansson | 222/101 |
| 3,349,705 | 10/1967 | Wilson | 102/27 |
| 3,471,668 | 10/1969 | Wilkes | 222/102 |
| 3,493,074 | 2/1970 | Murray | 181/116 |
| 3,719,144 | 3/1973 | Tlam | 102/DIG. 9 |
| 3,797,392 | 3/1974 | Eckels | 102/DIG. 9 |
| 3,840,846 | 10/1974 | Dick | 181/116 X |
| 3,851,587 | 12/1974 | Alchorn | 102/27 R |

FOREIGN PATENT DOCUMENTS

| | | | |
|---|---|---|---|
| 630,608 | 11/1961 | Canada | 102/DIG. 9 |

*Primary Examiner*—Verlin R. Pendegrass

[57] ABSTRACT

An elongated tubular container filled with a liquid explosive charge is provided with a detonator at one or both ends thereof to provide a linear explosion along the length of the tubular container. The tube may be buried in the ground by a tube burying plow, suspended by floats in water, laid on the ocean bottom, etc. for forming ditches, providing seimic sources, etc. By providing a small tube in a larger tube, a potential explosive liquid can be activated by an activator contained in the small tube, by removing the small tube from the large tube through squeezing rollers at one end of the large tube.

14 Claims, 21 Drawing Figures

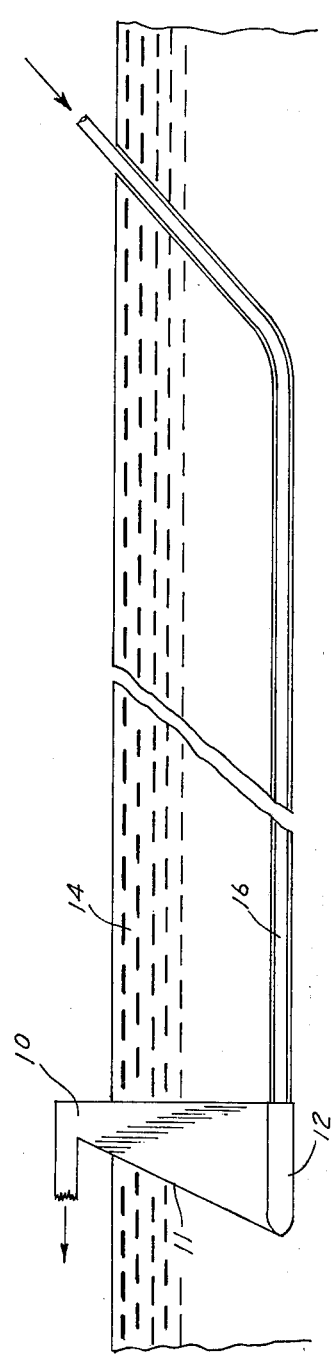
FIG. 1
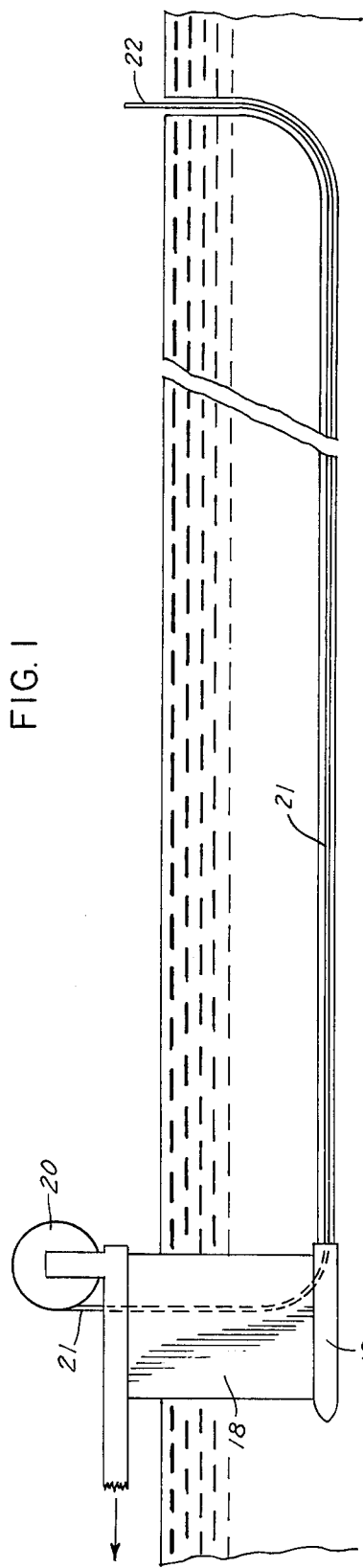
FIG. 2
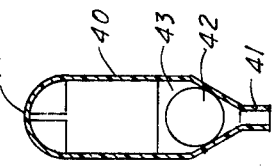
FIG. 8
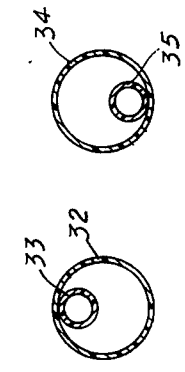
FIG. 7
FIG. 6
FIG. 5
FIG. 4
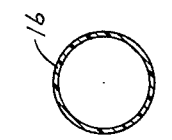
FIG. 3

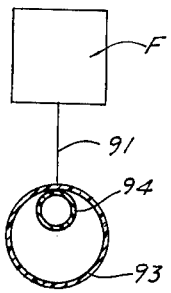
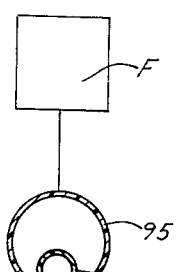
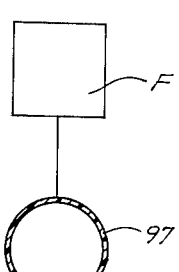
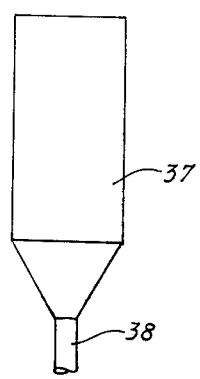
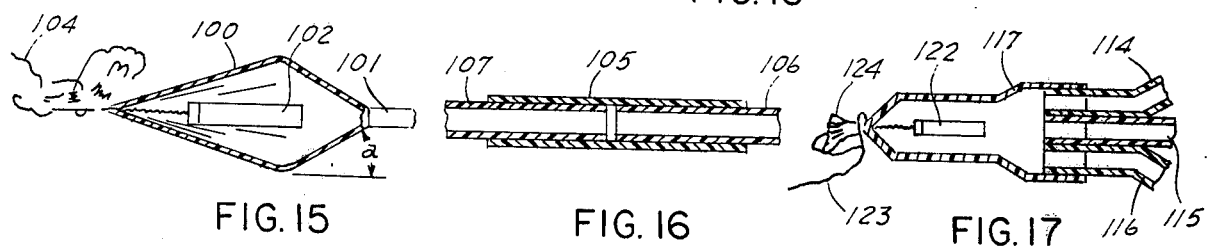
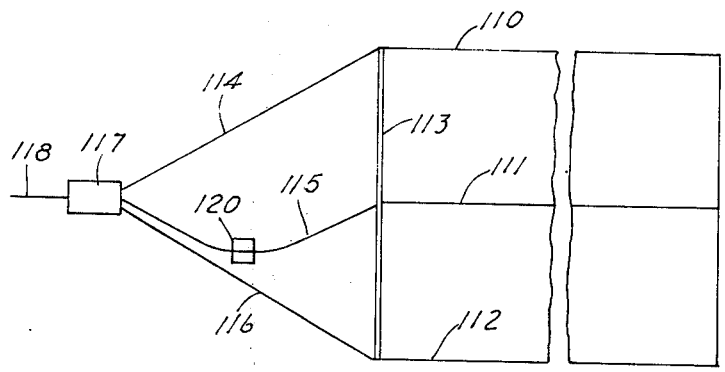
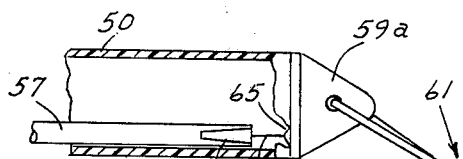
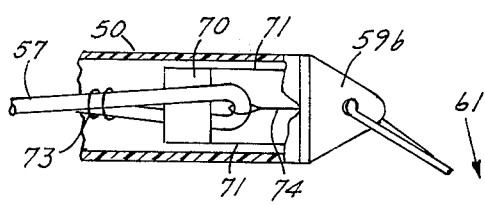
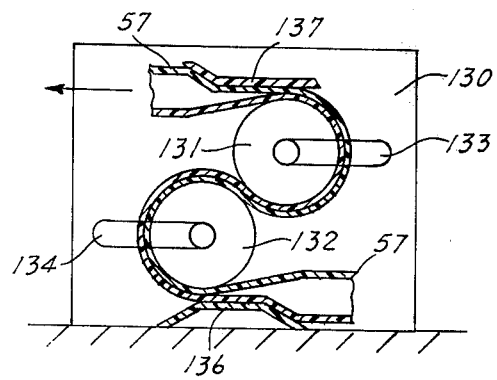

4,034,672

LINEAR EXPLOSIVE

BACKGROUND OF THE INVENTION

This invention relates to elongated linear explosives and methods of producing the same. The subject matter of this application is described in Document Disclosures Nos. 33792 dated July 16, 1974 and No. 34395 dated Aug. 6, 1974 both filed in the United States Patent Office.

Elongated, linear explosive charges may be used, among other uses, for ditching (on land or under water) as well for seismic energy sources. Seismic energy sources have been, heretofore, accomplished with detonating cord on land and for offshore by means of a gas charged hose.

According to the present invention, there is provided inexpensive and very effective energy sources, of an explosive nature, by use of a liquid explosive in an elongated tube, hose, pipe or the like. In one form, an explosive liquid is poured into an elongated chamber (of a desired diameter and length for the particular use), both ends sealed, and the charge is detonated by a detonator in one or both ends. The elongated chamber may be filled and then positioned. In another form, a small, activator filled inner elongated chamber in a larger diameter, elongated chamber filled with a potential explosive material may be withdrawn to continuously discharge a measured portion of the activator in the potentially explosive material to form an elongated explosive charge. Means are provided for positioning the elongated containers, filling such containers, activating and detonating the charge.

Included among the objects and advantages of the invention is to provide a simple and effective elongated, linear explosive charge.

Another object of the invention is to provide an elongated, linear liquid explosive.

Still another object of the invention is to provide elongated, liquid linear explosive charges for use on land or buried therein, or underwater for ditching, seismic energy or the like.

Yet another object of the invention is to provide means for positioning and preparing an elongated liquid explosive charge for land use as well as offshore use.

Another object of the invention is to provide means for precisely mixing a liquid activator into a liquid potential explosive filled in an elongated container.

An additional object of the invention is to provide means for sinking, floating or neutralize the buoyance of an elongated liquid explosive charge for offshore detonations.

These and other objects of the invention can be readily ascertained by referring to the following description and appended illustrations, in which:

FIG. 1 is schematic, side elevational view of one form of burying a tube underground for producing a positioned elongated explosive charge.

FIG. 2 is a schematic, side elevational view of another form of laying tubing underground for producing a positioned elongated explosion.

FIG. 3 is a cross-sectional view of one form of tube for use in forming a linear, liquid explosive charge.

FIG. 4 shows a cross-sectional view of a tube for an explosive providing three compartments for containing a explosive, a weight and a gas.

FIG. 5 is a cross-sectional view of a two compartment tube with a smaller tube secured to the bottom of the larger tube, with the smaller tube normally containing explosive and the larger tube containing gas.

FIG. 6 is a cross-sectional view of a compartmented tube in which an explosive is normally carried in the smaller tube, a weight of liquid or other mass carried in the larger void.

FIG. 7 is a cross-sectional view, similar to that of FIG. 5, wherein the explosive charge is filled in the large void and air or gas in the smaller tube.

FIG. 8 is a cross-sectional detail of a filled tube indicator, for securing to one end of a tube being filled by a liquid from the opposite end.

Figure 9:
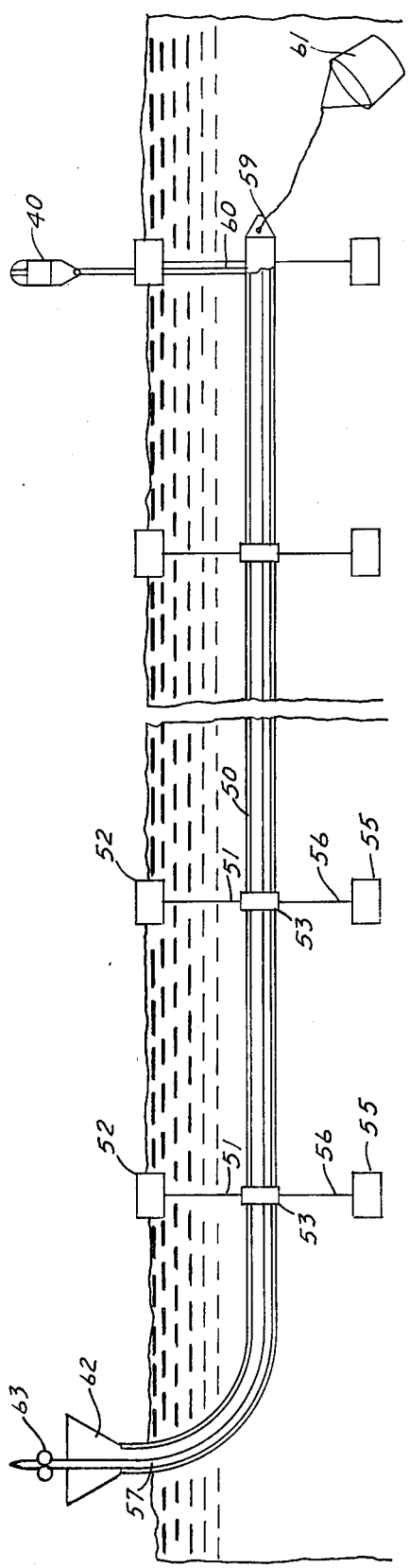
FIG. 9 is a schematic, side elevational view of a floating-weighted explosive system illustrating charging means for a large tube, an enclosed small activator tube with stripping means at one end to the other end thereof; and an indicator for a filled large tube.

FIGS. 11, 12, and 13 are schematic, cross-sectional details of floating and weighting of elongated, explosive filled containers.

FIG. 14 is a schematic, side elevational view of a means for a filling funnel.

FIG. 15 is a schematic, cross-sectional view of one type of initiating section arranged to be secured in the end of a tube filled with liquid explosives.

FIG. 16 is a cross-sectional view of one form of connector for explosive containing tubes.

FIG. 17 is a schematic plan view of a common point initiating manifold for a plurality of elongated linear charges.

FIG. 18 is a schematic, plan view of a detonating bridle for simultaneously exposing three elongated liquid explosive charges, mounted in generally parallel lines.

FIG. 19 is a schematic side elevational view of a pump and small tube drawing and stripping device.

FIG. 20 is a schematic, side elevational view of one form of releasable closure for an activator tube, mounted in an elongated liquid explosive container; and FIG. 21 is a schematic, side elevational view of a modified means for opening an activator tube in a charge of potential explosive liquid in an elongated container.

In general, one form of the invention consists of two elongated tubes or hoses, preferable flexible, arranged with a small tube in a larger tube, on the larger arranged to be filled with a liquid or a flowable explosive for filling the large tube. When the small tube is withdrawn and stripped, the large tube provides a linear explosive. The explosive charge may be detonated from one or both ends. The elongated containers for explosives may be placed on top of the ground, or underground by known tube burying means also they may be used in water offshore for various purposes. An onshore, underground placement of the tubular type container is by use of a tractor for burying such things as plastic pipe in buried sprinkler systems, cables for telephone systems, and the like. In such cases, a plow attached to a tractor slits the earth to the desired depth and lays a tubular conduit or cable at the bottom of the slit. As shown in FIG. 1, a plow standard 10 having a sharpened edge 11 and a tubular horizontal member 12 at the bottom slits the earth 14 as the plow is pulled by a tractor, not shown, in the direction of the arrow. A tube 16 is attached to the bulbous member 12 and it is pulled through the slit opening left by member 12. The tube is layed in the bottom of the slit. The tubing is normally mounted on a reel adjacent the inlet of the plowing start. In a similar manner, the device of FIG. 2 includes a vertical standard 18 having a bulbous bottom, member 19 which is pointed, for attachment to a tractor, not shown, for pulling in the direction of the arrow. A reel 20 is mounted on the standard and a tube 21 passes down through the standard and exhausts outward from the back end of the bulb 19. The end 22 of the tube is normally anchored so that the plow does not pull the tube through the earth. In this manner a tube may be placed underground for forming an elongated explosive, to form a ditch, or the like. In these cases the tube is normally emptied when it is placed in position, and it may then be filled by pouring the sensitized explosive or the potential explosive into the tubular unit.

The tubular container may take numerous shapes, and in this application the shapes are described as circular, however, other cross-sectional shapes may serve equivalent purposes. The tube shown in FIG. 3 is a single open tubular member of the length necessary, and it is arranged to be filled with a sensitized explosive after the tubular member is positioned underground or on the ground where desired. After filling by a funnel, such as shown in FIG. 14, the filled tube is sealed at both ends, with a detonator in one or both ends, and leads from the detonator to an initiator. The tube 16 may be inexpensive plastic, rubber, or other flexible material, effectively impervious so as to hold the explosive liquid, and it must be strong enough to withstand handling and manipulation of the positioning of the tubular member.

The tubular container of FIG. 4 includes an exterior tubular shell 23 in which is mounted a generally concentric inner tubular shell 24. A web 25, secured to the inner tube at one side and to the inside of the outer tube, and a web 26 on the opposed side forms chamber 27 on the bottom and chamber 28 on the top, which are separate chambers. With such a tube the explosive charge may be filled in the inner, small tube with a weighting material charged into the space 27. Air or gas may be charged into the space 28 to provide energy partitioning, impedence matching, and coupling characteristics.

The tube 30 shown in FIG. 5 includes a small tube 31 is secured to the bottom interior of the larger tube 30. With the small tube 31 filled with explosive and the larger tube filled with a gas there is provided a means of energy partitioning. A tube 32 is shown in FIG. 6 having a smaller tube 33 secured to the top thereof. The tube 32 is filled with a weighting material of liquid or other mass while the small tube is filled with explosive to obtain better impedence matching and coupling as useful in seismic energy sources. In the configuration of FIG. 7, the small tube 35 at the bottom of the larger tube 34 is filled with air while the larger spaces filled with the explosive to provide a linear jet in the direction of the common wall, and beyond, for energy partitioning or cutting as desired.

After the tube has been placed by a plow, or otherwise, both ends of the tube remain above ground. One end of the tube is fitted with a filling funnel 37, shown in FIG. 14 with its end 38 mating with the opening of the tube above ground. The opposite end of the tube is provided with an indicator, FIG. 8, which includes a clear, enlarged, hollow bulb 40, necked down to a connector member 41 which telescopes with the tube end positioned above the ground. The bulb 40 includes a ball float 42 which normally rests on the shoulder of the bulb in an area 43 which is opaque so that the ball is not visible when the indicator is in the upright position. A small bleed hole 44 permits exhaust of excess liquid to waste after "full" indication thereby closing, or sealing, that end of the system from extraneous water or dirt so that when liquid fills the bulb 40 the ball floats, and it will be visible indicating the tube is full.

For offshore detonations, shown in FIG. 9, a tubular member 50 is suspended on lines 51 from floats 52 attached to a collar 53 surrounding the tube. A weight 55 is secured to a line 56, which is, likewise attached to the collar and provides means for balancing the tube to proper depth below the surface of the water. The number of floats and weights necessary will be determined by the size and length of the tube, as well as the material to be filled into the tube. The tube shown in FIG. 9 is a two tube system in which a small tube 57 is mounted in the larger tube 50 prior to the placement of the tube in the water. It is to be noted that such a two tube system may, also, be used in onshore locations as where the tube would be buried with a plow as described above. At the right end of the tube 50 is a closure member 59 having a lateral breather tube 60 to which may be attached an indicator 40 such as described for FIG. 8. A sea anchor 61 may be provided, attached to the closure to hold the tube end. The anchor may be a sea anchor, fricton anchor, or other anchors to hold the end in predetermined location. The inner tube 57 is normally filled with an activator and it is secured to the end seal 59 by a means so that it may open the tube when the small tube 57 is withdrawn from the larger, such means being explained below. When the tube 50 containing the inner tube 57 full of activator is properly positioned, the larger tube 50 may be filled by means of a funnel 62 secured to the free end of the tube, which is raised above water when offshore or above land when onshore. A potential liquid explosive or pourable explosive may be poured into the tube, and when full the indicator 40 will indicate that condition. For activating the potential explosive liquid, a pair of rollers 63, with the tube 57 pulled therethrough, is rotated to pull the tube 57 from the large tube 50 and to squeeze out the contained liquid. This liquid flows out the end of the small tube mixing with the liquid material in the large tube. As shown in FIG. 20, a closure 59a is provided with an anchor 65, to which is attached a short line 66. A stopper 67 is attached to line 66 and the stopper fits in the small tube 57 sealing the same until the tube is pulled. On pulling tube 57 it is pulled from the stopper 67 opening the tube end. As the small tube is continuously pulled and squeezed by the rollers, liquid will flow from the tube into the potential liquid in the large tube. Another closure form is shown in FIG. 21, where a closure 59b is provided with a knife blade 70 secured by means of lines 71 to the closure 59. The end of the small tube 57 is wrapped around the knife blade 70 and secured to itself with the ties 73. Another line 74 may be attached to the bent back tube end (of the tube 57) to prevent it from touching the knife blade during placement. The line 74 will rupture when the tube 57 is pulled, and the knife blade slices the bent back tube opening it and releasing the contents into the large tube as the small tube is withdrawn from the large tube.

Figure 10:
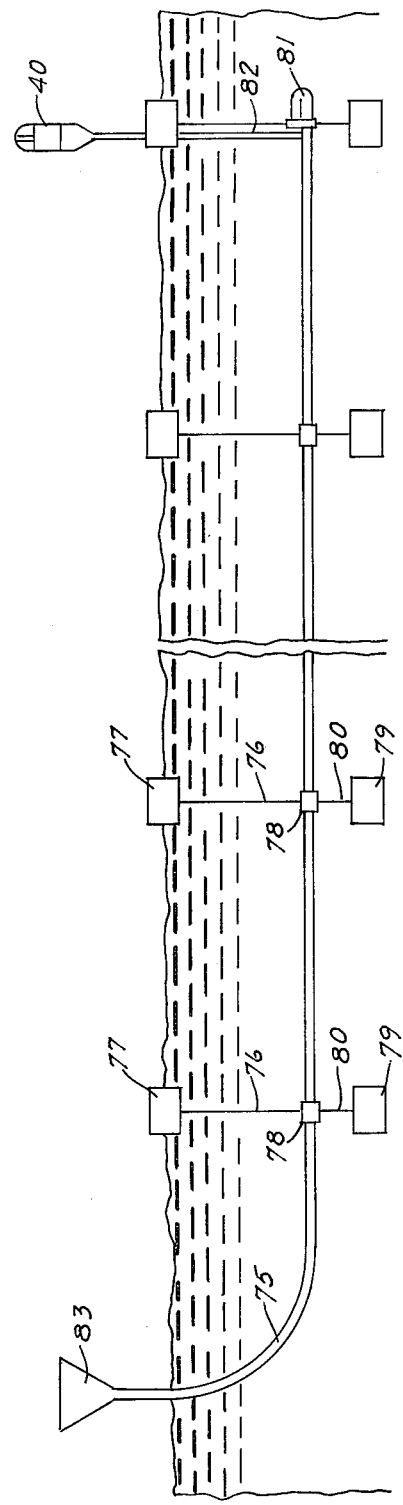
FIG. 10 is a schematic cross-sectional view of a single tube, elongated explosive system arranged for filling with a sensitized liquid explosive.

A simplified system, shown in FIG. 10, includes a tube 75 suspended by lines 76 from the floats 77 with a line 76 attached to a collar 78 around a tubing 75. A weight 79 on line 80 provides means for positioning the tubing in water. The end of the tubing 75 is closed by closure 81, and a lateral tube 82 extends upwardly above the water and it is closed by a sight bulb 40, explained above. This tube may be filled by a funnel 83, which is attached to the tubing 75 above water. In this arrangement the linear charge is designed to be filled with presensitized liquid explosive, for example, nitromethane containing about 5% of weight by diethylenetriamine. To reduce the hazard from adiabatic compression the tube is gravity filled, where the explosive liquids displace air or gas during the filling of the tube.

As shown in FIGS. 11, 12 and 13, several configurations for offshore detonation tubes are described. In this case, a buoy or float F is attached to a line 91 attached to a tube 93, having a small internal tube 94 secured to the top thereof. The large volume of the tube 93 is filled with a weighting material (liquid or solid) for holding the tube below the buoy F. The small tube 94 may be filled with the explosive. In the configuration of FIG. 12, a tube 95 secured to a float F and is held in position by a weight W. The space of the larger tube 95 may be filled with an explosive while a smaller tube 96 may be filled with a gas, which provides a directional explosive to allow for energy partitioning. The configuration of FIG. 13 is to provide an explosive liquid, fully filled tube 97 suspended from a float and secured tin position by weight W.

An initiator section is shown in FIG. 15, wherein an enclosed flexible bag 100 is mounted on a tube 101 which is filled with a sensitized liquid explosive. The bag 100 is filled with the liquid explosive filling the tube 101, and a detonator cap 102 is secured in the bag normally positioned centerally of the bag filled with the explosive liquid. The lead wire from the detonator cap is pulled through the bag 100, and the bag is completely sealed around the detonator wires to prevent it from leaking. The connection angle of the bag 100 into the tube 101 must be kept at a low angle, preferably less than about 30° to assure continuity of detonation from the initiating section into the tube 101. Also, to keep continuity of the explosive, a connector such as shown in FIG. 16, includes a tubular outer connector 105 secured to the ends of tubes 106 and 107, the connector being secured by cementing, or the like. This provides for a splice of the explosive containing tube, and the splice must be made to define a full diameter of the tubes.

When three or more linear charges positioned in a parallel position, and are intended to be exploded simultaneously, a bridle such as shown in FIG. 18 may be provided. In this case, lineal charges 110, 111 and 112 are mounted in parallel positions with the left ends secured apart an equal distance by means of a rod 113. Equal length leads 114, 115 and 116 are secured to a common end initiator 117, which is fired by a activator lead 118 extending from the opposite side. When used underwater a float 120 may be attached to the middle line 115 to keep it from fouling and preventing detonation through the lead. A similar type bridle is described in my U.S. Pat. No. 3,741,119.

A common point initiator 117, FIG. 17, includes a housing 117 securely fastened to the ends of tubes 114, 115 and 116 providing a leak proof connection, with the liquid explosive material contained in the tubes and the housing. A detonating cap 122 is mounted in the housing 117, and a lead wire 123 to an electrical activating device is sealed into the housing by means of a seal 124.

One means of drawing and stripping the small activator tube is shown in FIG. 19, wherein a base 130 has the shafts of a pair of rollers 131 and 132 mounted in slots 133 and 134, respectively, with the tubing 57 extended over the roller 132 and back over the roller 133 beneath wiping guides 136 and 137 respectively adjacent the rollers 132 and 131. The tube may be pulled onto a reel, not shown, arranged to pull the tubing 57 therethrough and to squeeze liquid out the free end of the tube 57 as it is pulled out the tube. The tension of the tube 57 maintains the rollers together.

The elongated explosive container is useful for a liquid, potential explosive, filled with a sensitizing material of open pores and high permeability, such as described in U.S. Pat. No. 3,767,392. The potential explosive liquid may be nitromethane or ethylene glycol mononitrate, for example, and by using pellets of an open pore, high permeability polyethane, a reversable explosive system may be provided. Such a system is reversable, for example, by merely pumping in the explosive material from the tube, filtering out the permeable polyethane sensitizing material, to provide the non-sensitized liquid and the separate pellets. The elongated containers, also, may be useful for sensitized liquids such as nitromethane and an amine, hydrazine and hydrazine nitrate, etc. In one case, the nitromethane would be in the larger tube, for example, and the amine would be in the smaller tube, so that about 5% by mass would be mixed with nitromethane as the small tube is pulled out and the liquid amine is squeezed from the tube. In using large tubes or hoses of sufficient diameter to allow the desired explosive loading weight, a smaller thin wall tubing could be mounted internally as such a tube. In this case, the smaller thin wall tubing would have a cross-sectional area portioned to the remaining area in the larger tube, as the smaller or equal component of the binary system would be proportionate to the larger component. As pointed out nitromethane may be activated by about 5% by weight of diethylene triamine. In some instances, it may be desirable to place a propeller or other flow impeding means at the end of the small tube being withdrawn from the larger tube to insure mixing of the material from the small tube into the larger material in the large tube.

Using a linear explosive, where the tube diameter is sufficient to maintain propogation for the liquids to be detonated, smaller sizes may be readily substituted for the presently used detonator cord to allow both selective arming or disarming, as well as the major costs savings. The linear explosives may be used in parallel area spreads for seismic energy sources either offshore or onshore, and they may be used singley or in multiples for seismic energy sources. Offshore trenching may be performed to preferential shapes at high speeds by weighting the tubes and positioning them on or in the bottom to be trenched. Rapid onshore ditching for irrigation and drainage canals may form with the lineal charges, as well as for surface use in blasting firebreaks for fire control. In fire control the tubes may, also, include segments or portions filled with fire suppressants as well as the explosive for explosively putting out a fire and spraying suppressants in the area. For example, a four inch diameter plastic tube may be loaded with an inexpensive charge, having a loading of about six pounds per foot, to provide a rapid trenching method in many soils. The detonation may be by detonator caps, detonator cord, or other suitable primer.

What is claimed is:

1. A linear explosive device for excavating, energy partitioning or impedence matching, consisting of
   a. an elongated flexible tube formed of one of the class of plastic and rubber, for positioning along the intended path of explosion,
   b. a smaller, elongated flexible tube formed of one of the class of plastic and rubber, positioned in said larger tube and fixedly secured in said large tube,
   c. one said tube being filled with a essentially liquid explosive charge,
   d. the other said tube being filled with an inert material, and
   e. detonating means secured to at least one end of said tubes in contact with the explosive charge.

2. A linear explosive device according to claim 1 wherein said small tube is secured concentrically of and spaced from said larger tube.

3. A linear explosive device according to claim 2 wherein opposed webs are secured to opposite sides of said small tube extending generally radially therefrom and secured to the inner wall of said large tube forming three compartments, the top of which is filled with a gas, the center is filled with the explosive charge and the lower is filled with a weighting liquid.

4. A linear explosive device according to claim 1 wherein said small tube is secured adjacent to the inner wall of the large tube.

5. A linear explosive device according to claim 4 wherein said small tube is filled with the explosive charge.

6. A linear explosive device according to claim 5 wherein the larger tube is filled with a gas and the smaller tube is at the bottom of the larger tube for an energy partitioning means.

7. A linear explosive device according to claim 5 wherein the small tube is secured to the inner top of the large tube and the large tube is filled with a weighting material for impedence matching.

8. A method of setting an elongated charge for producing a lineal explosive, comprising
   a. positioning a small elongated plastic or rubber flexible tube in a larger plastic or rubber flexible tube so as to be essentially coextensive therewith,
   b. filling said small tube with a liquid sensitizer,
   c. filling said larger tube with a liquid to be sensitized into an explosive,
   d. opening one end of said small tube and maintaining said open end internally of said large tube,
   e. simultaneously withdrawing and stripping said small tube from said large tube so as to deposit sensitizer into said liquid in said large tube to be sensitized along its length in a relative proportion, and
   f. installing detonation means in at least one end of said large tube in contact with said liquid.

9. A method according to claim 8 wherein said elongated tube is positioned below a surface and both ends are initially positioned above the surface for the filling operation, and the end opposite the filling end includes gas release means and liquid indicating means.

10. A method according to claim 9 wherein said elongated tube is positioned under water by means of floats and weights secured thereto along its length.

11. A method according to claim 9 wherein said tube is buried in the ground by a tube burying machine.

12. A method according to claim 8 wherein said small tube is closed by plug means anchored to said large tube so that withdrawal of said small tube unplugs the same.

13. A method according to claim 8 wherein said small tube is filled with a sensitizing amine and said large tube is filled with nitromethane to provide a mass mixture of about 5% amine to 95% nitromethane.

14. A device for producing an elongated linear explosive for excavating, energy partitioning or impedence matching consisting of
   a. a first elongated, flexible tube formed of one of the class of plastic and rubber, for positioning along the intended path of explosion;
   b. a smaller, elongated flexible tube formed of one of the class consisting of plastic and rubber and of essentially the same length as said first flexible tube and telescoped in said first flexible tube so as to be co-extensive therewith;
   c. one end of said smaller tube being closed so as to contain a liquid sensitizer;
   d. means for filling said larger tube with a liquid which when sensitized is an explosive;
   e. means arranged to open said closed end of said smaller tube on withdrawal of said smaller tube from said larger tube; and
   f. means for withdrawing said small tube from said larger tube and simultaneously stripping said small tube so as to deposit the material from said small tube into said large tube at a relative proportion along its length.

* * * * *